July 18, 1950

W. H. DOHERTY 2,515,339

THREE COORDINATE INDICATING
SYSTEM FOR RADAR APPARATUS

Filed June 27, 1947

INVENTOR
W. H. DOHERTY
BY
Franklin Mohr
ATTORNEY

July 18, 1950      W. H. DOHERTY      2,515,339
THREE COORDINATE INDICATING
SYSTEM FOR RADAR APPARATUS Filed June 27, 1947      5 Sheets-Sheet 3

| 28750–29000 | 29000–29250 | 29250–29500 | 29500–29750 | 29750–30000 |
|---|---|---|---|---|
| 26250–26750 | 26750–27250 | 27250–27750 | 27750–28250 | 28250–28750 |
| 22500–23250 | 23250–24000 | 24000–24750 | 24750–25500 | 25500–26250 |
| 15000–16500 | 16500–18000 | 18000–19500 | 19500–21000 | 21000–22500 |
| 0–3000 | 3000–6000 | 6000–9000 | 9000–12000 | 12000–15000 |

RANGES IN YARDS

FIG. 6

| 21·46··· | 22·47··· | 23·48··· | 24·49··· | 25·50···<br>625<br>15625 |
|---|---|---|---|---|
| 15021··· | 15022··· | 15023··· | 15024··· | 15025··· |
| 16·41··· | 17·42··· | 18·43··· | 19·44··· | 20·45··· |
| 15016··· | 15017··· | 15018··· | 15019··· | 15020··· |
| 11·36··· | 12·37··· | 13·38··· | 14·39··· | 15·40··· |
| 15011··· | 15012··· | 15013··· | 15014··· | 15015··· |
| 6·31· | 7·32··· | 8·33··· | 9·34··· | 10·35··· |
| 15006··· | 15007··· | 15008··· | 15009··· | 15010··· |
| 1·26...601<br>15601 | 2·27····· | 3·28···· | 4·29··· | 5·30···· |
| 15001···· | 15002··· | 15003··· | 15004··· | 15005··· |

INVENTOR
W. H. DOHERTY
BY
Franklin Mohr
ATTORNEY

Patented July 18, 1950

2,515,339

UNITED STATES PATENT OFFICE 2,515,339

THREE COORDINATE INDICATING SYSTEM FOR RADAR APPARATUS

William H. Doherty, Summit, N. J., assignor to Bell Telephone Laboratories, Incorporated, New York, N. Y., a corporation of New York Application June 27, 1947, Serial No. 757,566

4 Claims. (Cl. 343—11)

This invention relates to apparatus for the location of objects by means of exploratory waves of radiant energy sent out from a transmitting station, reflected by an object, and detected at a receiving station. Apparatus of this type is commonly known as radar. The invention more particularly relates to means for visual presentation of information regarding the position of objects located by radar.

Radar systems have undergone a development that has led to the employment of radiation of shorter and shorter wavelengths, thereby making it practicable to send out the exploratory waves in the form of a very narrow beam giving a high degree of resolution of different objects and making possible very precise determination of the azimuth and elevation of an object.

With a narrow beam, the finding of a target is difficult and systematic scanning of the field of observation is necessary or desirable. If the beam is narrow in two dimensions, analogously to a searchlight beam, the scanning is required to be effected in two dimensions. When a target is found, it is desirable to know the range of the target as well as the azimuth and elevation. The problem then arises as to how best to present three-dimensional information upon the screen of an oscilloscope. Convenience in reading dictates that azimuth and elevation be presented in the manner of a scene in television technique but this arrangement of course, makes no provision for indicating the range, i. e., distance of an object. Relative size and intensity of objects and perspective effects of the television system generally have no counterpart in the radar system. In addition, the precision attainable in measuring distances by radar technique is much greater than can be portrayed in the television type representation.

In accordance with the present invention, the viewing screen of the oscilloscope is divided into a plurality of subdivisions, there being 25 subdivisions in the illustrative embodiment described herein. A number of views appear simultaneously, one in each subdivision of the screen. Each such view is of the television type, presenting azimuth and elevation as rectangular coordinates and showing objects as bright spots. Such views are known in radar parlance as type C representations. Each subdivision of the screen is reserved for representing objects lying in a relatively small group of ranges, centering about a different range in each subdivision of the screen. That is, the nearest objects are shown in one subdivision of the screen, the farthest objects in another, and intermediate objects are shown by groups in other subdivisions of the screen.

In the illustrative embodiment of the invention shown herein, exploratory pulses are sent out at a repetition rate of 1000 per second, while the beam is caused to scan a limited field at a relatively slow rate. For example, the field of each view may cover an angle of 15 degrees in azimuth and an angle of 15 degrees in elevation. Each view may be composed of dots, analogously to the dots comprised in a half-tone engraving. There may be, for example, 25 dots in the horizontal direction and 25 dots in the vertical direction, one exploratory pulse being sent out for each dot, or 625 pulses, to complete a view. As will be explained hereinafter, the entire 25 views are formed in the same period of time as a single view. At the rate of 1000 pulses per second the entire screen is covered in 0.625 second which is at the rate of 1.6 coverages per second, or 1.6 frames per second in television parlance. At that rate, a viewing screen of fairly high visual persistence is advantageous, particularly a phosphorescent screen, in order that the representation may seem continuous to the eye.

In the illustrative embodiment, the exploratory beam scans the field line by line as in a television system. Assuming, as in the example given, a picture comprising 25 lines with 25 dots per line, to represent a field of view 15 degrees in azimuth and 15 degrees in elevation, the beam must move three-fifths of a degree in the time interval between two successive pulses. At the assumed rate of 1000 pulses per second, the line scan requires 0.025 second. This means a horizontal scanning frequency of 40 scans per second. The vertical scanning frequency, as indicated above, is 1.6 scans per second.

It will be noted that each transmitted pulse may bring in information in the form of not only one but possibly several reflected pulses, each reflected pulse indicating an object at a different range, and having the then existing azimuth and elevation of the beam.

Assuming an apparatus designed to indicate objects up to a maximum range of 30,000 yards, a time interval of 183 microseconds is required for a pulse to go out to and return from an object at the maximum range. An echo may return any time up to 183 microseconds after the transmittal of a given pulse, the time of the return indicating the range of the object which has produced the echo.

In accordance with the invention it is desired to record each echo in the proper subdivision of the screen corresponding nearest to the range of the object. This is done by shifting the electron beam of the oscilloscope rapidly from one subdivision to the next, stopping briefly in each subdivision during a part of the 183 microsecond period. The electron beam is stopped at the proper position in each subdivision which position corresponds to the azimuth and elevation of the radar beam at the instant the echo is received.

It is advantageous to have the cathode ray beam make at least a faint dot each time it rests momentarily upon the oscilloscope screen, whether or not an echo is received. This may be insured by amplifying the noise currents to be applied to the control grid of the oscilloscope to a sufficient degree so that a just barely visible intensity of light is produced. An echo from an object will, under these circumstances, produce a relatively much brighter spot which will indicate the presence and direction of the object. Under this system there will be 25×625 or 15,625 dots shown upon the screen, each dot conveying the information whether or not an object is present in a given interval of range, azimuth and elevation. Each of the 15,625 dots is produced in its own proper position on the screen of the oscilloscope.

In accordance with the invention, the dots are not formed in such order of time as to complete the several views one after the other. Instead, a dot is made in the upper left-hand corner of each screen subdivision in rapid succession. By the time the 25 subdivisions have each received one dot, the radar beam has moved 0.6 degree in azimuth and 0.024 degree in elevation. A second dot is now made alongside the first dot in the first subdivision and so on in each of the 25 subdivisions. Then a third dot is made in each subdivision, and so on until each of the 25 subdivisions has 625 dots, making the total of 15,625 dots above mentioned.

The first 25 dots are made during the interval of 183 microseconds immediately following the first transmitted radar pulse. Thereupon the range measuring apparatus has a rest period of 817 microseconds within which all switching operations and restorations of circuits to normal occur. At the end of 1000 microseconds a second transmitter pulse is sent out and the second round of 25 dots is formed in rapid order occupying again an interval of 183 microseconds followed by a rest period of 817 microseconds. Each dot is formed by luminescence of the phosphorescent material of the viewing screen induced by the cathode ray beam resting upon the screen for a few microseconds. It is advantageous to have the luminescence of each dot persist for at least 0.625 second, that is, until the beam returns to the same place. There is additional advantage in having the screen luminescence built up cumulatively by two or more successive applications of the beam at the same place at high beam intensity for the representation of an echo from an object.

The invention is more fully described hereinafter with reference to the accompanying drawings, in which.

Figure 1:
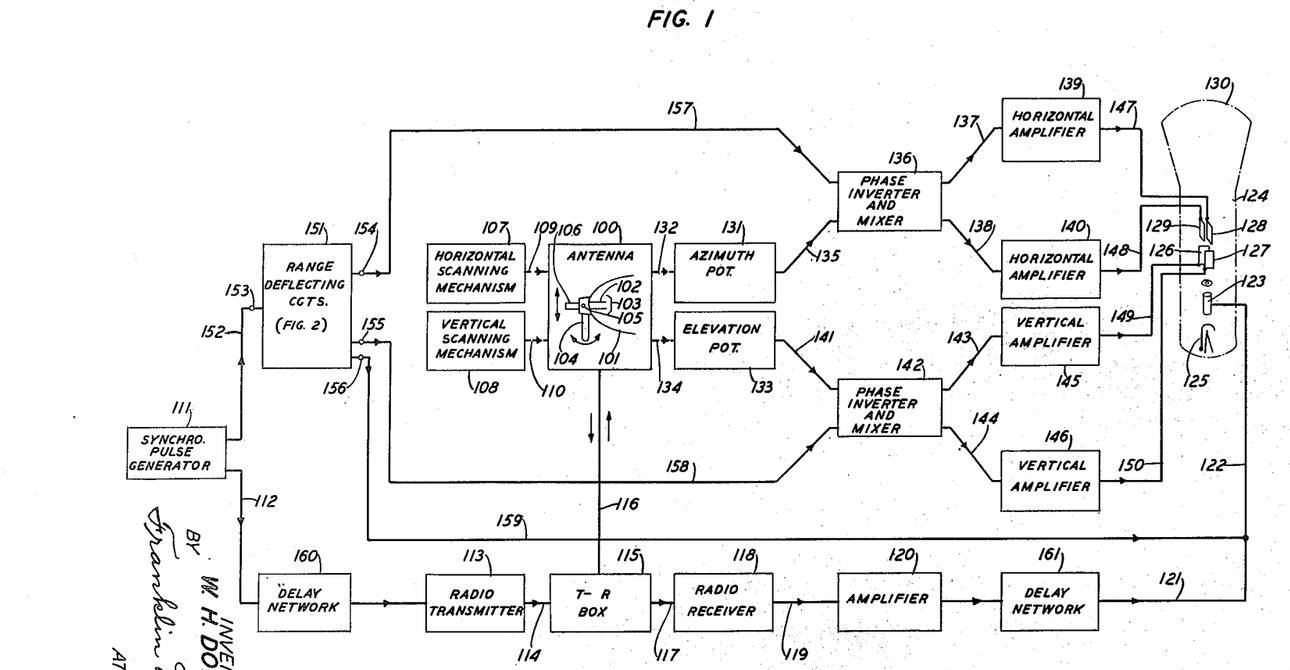
Fig. 1 is a single line schematic block diagram of a radar system embodying the invention.

Referring to the drawings, Fig. 1 represents a radar system conventional in many respects and illustrative of a system embodying the invention. An antenna 100 is employed, being of any suitable type which forms a narrow, pencil-like beam of transmitted waves and is analogous to a searchlight as used in an optical system for scanning the night sky in search of otherwise invisible objects. The antenna is represented diagrammatically as comprising a paraboloidal reflector 101, a wave guide feed pipe 102, a beam reversing reflector 103, a vertical shaft 104 for rotation or oscillation of the antenna in azimuth, a horizontal shaft 105 for rotation or oscillation of the antenna in elevation, and a lever 106 for effecting rotation about the shaft 105.

Scanning mechanisms 107 and 108, for horizontal scanning and vertical scanning respectively, are shown adjacent to the antenna 100. A broken line 109 is used in the drawing to represent a mechanical coupling between the horizontal scanning mechanism 107 and the vertical shaft 104 whereby the scanning mechanism may rotate or oscillate the antenna for azimuth scanning in any suitable manner. A broken line 110 similarly represents a mechanical coupling between the vertical scanning mechanism 108 and either the horizontal shaft 105 or the handle 106 to effect elevation scanning. The handle 106 may, of course, be modified as desired, or the mechanism 108 may be connected to the shaft 105 through any suitable linkage.

The radio transmitting and receiving portion of the radar system of Fig. 1 is conventional, comprising a synchronizing pulse generator 111 connected through a line 112 including a delay network 160 to a radio transmitter 113, connected in turn through a line 114 to a switching device 115 of the kind commonly known as a T-R box. From the T-R box a line 116 goes to the antenna 100 where it is connected to the wave guide feed pipe 102, details of which latter connection may be made in any suitable manner and are not shown. The line 116 serves both for transmitting radar signals from the T-R box to the antenna and for conveying received echo pulses from the antenna to the T-R box. A line 117 connects the T-R box to a radio receiver 118, the T-R box being so constructed as to permit no material direct transmission between the radio transmitter 113 and the radio receiver 118. A line 119 connects the radio receiver 118 to an amplifier 120, which in turn is connected through a delay network 161 and lines 121 and 122 to an electron beam intensity control grid 123 of a cathode ray oscilloscope 124. The delay networks 160 and 161 are advantageously employed either singly or together in a system embodying the invention.

The oscilloscope 124 comprises, in addition to the grid 123, a cathode 125, a pair of vertical deflection producing plates 126 and 127, a pair of horizontal deflection producing plates 128 and 129 and a phosphorescent viewing screen 130.

Mechanism is shown for causing the electron beam of the oscilloscope 124 to move about the screen 130 in synchronism with the scanning motion of the antenna 100, this mechanism being in part conventional and in part modified to function in accordance with the invention. The conventional part of the electron beam control mechanism will first be described. A potentiometer 131 commonly known as the azimuth potentiometer is represented as being mechanically coupled to the shaft 104 in the antenna 100, the mechanical coupling being represented schematically by a broken line 132. A potentiometer 133, commonly known as the elevation potentiometer, is mechanically coupled to the shaft 105, a broken line 134 representing schematically the requisite mechanical coupling. Each of said potentiometers is assumed to have a variable contactor which is movable along the winding of the respective potentiometer in response to and in accordance with the motion of the respective shaft to which the potentiometer is coupled. The resultant variable potential produced by the azimuth potentiometer 131 may be transmitted through a line 135 to a phase inverter and mixer 136 and thence through a pair of lines 137 and 138 to a pair of amplifiers 139 and 140, respectively, designated as horizontal amplifiers. The mixing function of the device 136 is not needed in a conventional radar system but is utilized in carrying out the invention as will be explained hereinafter. The variable potential produced by the elevation potentiometer 133 may be transmitted through a line 141 to a phase inverter and mixer 142 and thence through a pair of lines 143 and 144 to a pair of vertical amplifiers 145 and 146, respectively.

The horizontal amplifiers 139 and 140 are connected through a pair of lines 147 and 148 to the horizontal deflection plates 128 and 129, respectively. The vertical amplifiers 145 and 146 are similarly connected through a pair of lines 149 and 150 to the vertical deflection plates 126 and 127, respectively.

Figure 2:
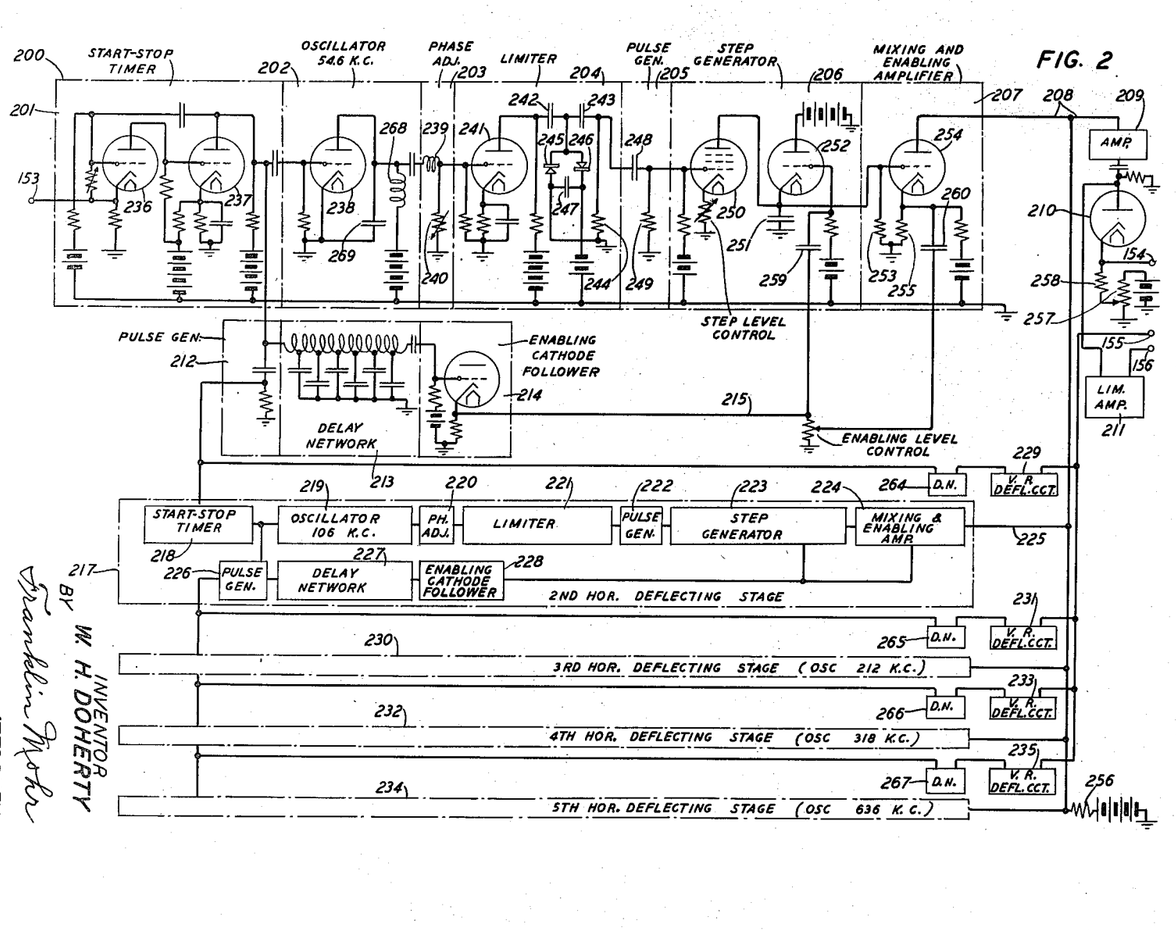
Fig. 2 is a schematic diagram of the portion of Fig. 1 included in the block labeled "Range Deflecting Circuits," the function of which is to shift the cathode ray rapidly from one screen subdivision to the next during the brief period when echoes may be expected to arrive from objects at different ranges.

The additional equipment employed in the practising of the invention will now be described in general terms. An assemblage of range deflecting circuits, shown in detail in Fig. 2 is represented by a block 151 in Fig. 1. The synchronizing pulse generator 111 is connected to the range deflecting circuits through a line 152 by way of an input terminal 153. The range deflecting circuits have three output terminals 154, 155 and 156. The terminal 154 supplies a horizontal range deflecting potential which is transmitted through a line 157 to the phase inverter and mixer 136 for supplemental control of the horizontal amplifiers in cooperation with the conventional azimuth control potential supplied by the azimuth potentiometer 131. The terminal 155 supplies a vertical range deflecting potential which is transmitted through a line 158 to the phase inverter and mixer 142 together with the potential from the elevation potentiometer 133 transmitted over line 141. The terminal 156 is connected through a line 159 to the grid 123 of the oscilloscope 124, by way of the line 122, or directly, as desired.

The conventional part of the operation of the system of Fig. 1 may be described briefly as follows. Synchronizing pulses at any suitable periodic rate, such as 1000 pulses per second are generated by the generator 111. Each synchronizing pulse activates the radio transmitter 113 for a brief interval, of the order of a microsecond more or less, during which time the radio transmitter generates a radar pulse of a suitable ultra high frequency comprising several hundred complete cyclic oscillations. The radar pulse is transmitted to the antenna 100, pointing in whatever direction it may be at that instant, and the pulse is radiated from the antenna in the form of a beam. If there be reflecting objects in the path of the radiated beam at the time, an echo pulse is reflected back to the antenna 100 from each object. The received echo pulse is transmitted to the radio receiver 118 where it is detected and passed along to the amplifier 120 as a video pulse. After amplification the video pulse is impressed upon the beam intensity control grid 123 in the oscilloscope 124, thereby intensifying momentarily the electron beam in the oscilloscope and producing a bright dot upon the screen 130 in the particular position thereon that the electron beam is striking at the instant. The radar pulse is repeated 1000 times per second under the control of the synchronizing pulses from the generator 111.

Meanwhile, the antenna 100 is being caused to scan a field of view with a 20 cycle per second horizontal oscillation accompanied by a 0.8 cycle per second vertical oscillation. The potentiometers 131 and 133 are so adjusted with respect to the scanning mechanisms 107 and 108 that the electron beam in the oscilloscope traces out a pattern upon the screen 130 which is a counterpart of the scanning pattern executed by the radiated beam from the antenna 100. The potential produced by the azimuth potentiometer is converted into a pair of push-pull potentials by the phase inverter 136, which potentials actuate the respective amplifiers 139 and 140 to develop amplified and balanced potentials which are impressed upon the respective deflecting plates 128 and 129 to cause horizontal deflection of the electron beam in the oscilloscope. The potential produced by the elevation potentiometer is similarly utilized to cause vertical deflection of the electron beam.

Figure 3:
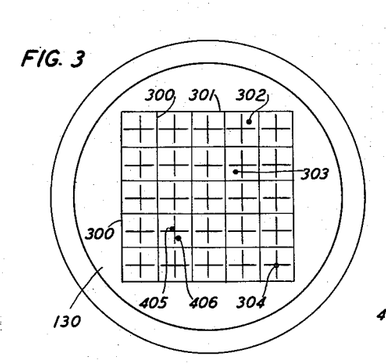
Fig. 3 is a front view of an oscilloscope showing the screen thereof divided into a plurality of subdivisions each representing a group of range values and some of the subdivisions showing spots which indicate objects from which echoes have been received.
Figure 4:
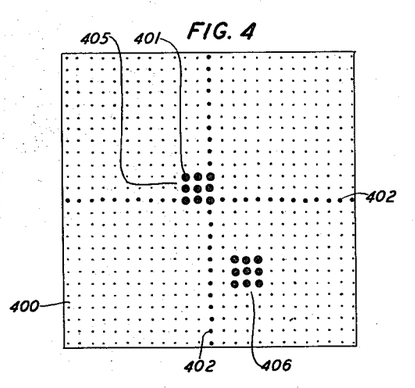
Fig. 4 is an enlarged view of one of the screen subdivisions, which appears in Fig. 3 in the second row up from the bottom and second column from the left.

In accordance with the invention, the deflecting potentials impressed upon the plates 126, 127, 128 and 129 are reduced in amplitude sufficiently to cause the electron beam to scan only a small portion of the total usable area of the screen 130 during each complete cycle of the scanning mechanism. Referring to Fig. 3, the screen 130 is shown divided into 25 subdivisions, which may, if desired, be permanently marked by vertical dividing lines 300 and horizontal dividing lines 301 and may each exhibit a pair of coordinate axes intersecting at the center of the respective subdivision. One subdivision of the screen is shown in magnified form in Fig. 4. The subdivision shown in Fig. 4 is intended to be the subdivision appearing in the next to bottom row and second column from the left in Fig. 3.

Also, in accordance with the invention, the deflecting potentials from the potentiometers 131 and 133 are combined in the mixers 138 and 142, respectively, with potentials supplied by the range deflecting circuits in such manner that during the brief interval, approximately 183 microseconds, immediately following each synchronizing pulse, during which interval echo pulses may be received from objects situated at various distances from the antenna 100, the electron beam is shifted from one screen subdivision to another, pausing for from roughly 1½ microseconds to 18 microseconds in each subdivision according to a predetermined scheme. During the 183 microsecond interval the direction in which the antenna is pointing is not appreciably changed nor is the relative position of the electron beam on each of the subdivisions of the screen 130 appreciably altered.

The normal intensity of the electron beam is preferably adjusted to produce a just barely visible dot upon the screen. Should an echo pulse affect the grid 123 while the electron beam is at rest in any part of the screen, the beam is intensified and a brightened dot is produced. In Fig. 4 the field of barely visible dots 400 is shown together with a number of brightened dots 401. Dots 402 of intermediate brightness may be employed to form visible coordinate axes. The dots 402 may be produced by causing the antenna to actuate a mechanical switch each time it passes the mean horizontal position and the mean vertical position. Such a switch may be connected to a potential source which in turn impresses a potential upon the grid 123 in well-known manner to intensify the electron beam to the desired degree. Arrangements for marking coordinates or scale points in this manner have been used heretofore and are familiar to those skilled in the art.

Due to the considerable width of even the narrowest practicable radiated beam under the best conditions, the beam upon striking an object will sweep across the object as the scanning motion continues and will not leave the object entirely until two or more radar pulses have been transmitted. In a typical case the beam width in both azimuth and elevation may amount to 1.8 degrees. In a scanning system in which the antenna moves 0.6 degree per pulse, the beam will rest upon a given object while a minimum of three dots are produced upon the screen. Accordingly, even the smallest observable object will produce a pattern on the screen comprising 3 dots arranged side by side horizontally and 3 rows of such dots one row over the next. Such a pattern of nine dots is shown at 405 and another at 406, in Fig. 4. Each group of nine dots appears as a single spot as viewed on a smaller scale in Fig. 3.

The time spent by the electron beam in one screen subdivision before shifting to the next determines the depth of the zone from which echoes are received and exhibited in that subdivision. For example, if the electron beam arrives in the lower left-hand subdivision at the time a radar pulse is transmitted and leaves that subdivision 18.3 microseconds later, echoes from objects situated from zero to 3,000 yards distant may be received and exhibited. If the beam then immediately shifts to the next subdivision and remains there 18.3 microseconds, echoes from objects distant 3,000 to 6,000 yards may be received and exhibited. Zones which are less likely to contain objects of interest or wherein less precise measure of the range is desired may be wide, whereas zones in which greater precision is desired must be made narrow. However, it is desirable to make the most distant zones narrow because the echoes from these zones may be relatively weak and might be obscured by the cumulation of noise if the cathode ray spot were allowed to remain in one place for a time interval corresponding to a wide zone.

Figure 5:
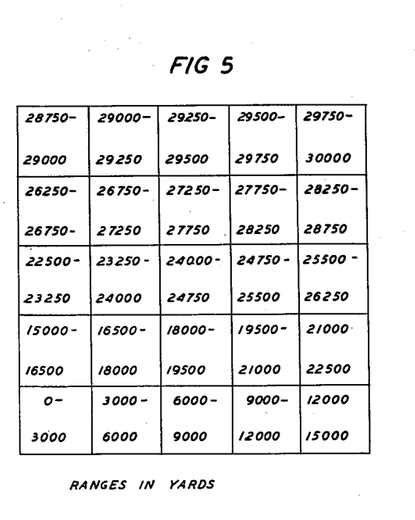
Fig. 5 is a table of the range values which may be assigned to the respective screen subdivisions in the view of Fig. 3, starting with the lowest ranges in the lower left-hand corner and ending with the highest ranges in the upper right.

Fig. 5 shows an illustrative scheme for allotting zones to the respective subdivisions in a screen showing 25 subdivisions and accommodating a maximum range of 30,000 yards. Increasing precision is provided as the range increases, the first five subdivisions representing 3,000 yards each, the next five 1500 yards each, the succeeding groups of five representing 750 yards, 500 yards, and 250 yards each, respectively. The 250-yard zones provide greatest signal-to-noise ratio for the weak echoes that may arrive from the most distant targets, as explained above. The views are arranged in order of increasing range, beginning with the lower left-hand subdivision and continuing across each row from left to right from the bottom row upward. The ranges from 29,750 to 30,000 yards are accommodated in the upper right-hand subdivision.

Figure 6:
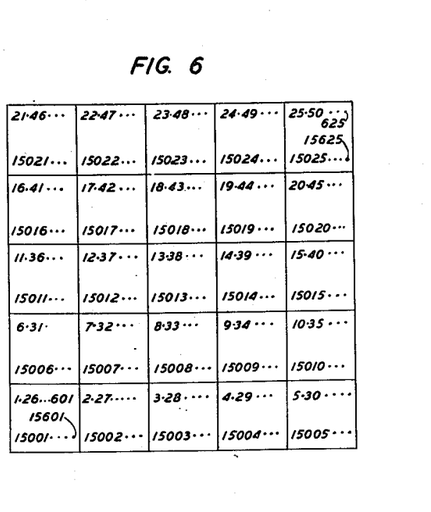
Fig. 6 is a schematic diagram showing the order in which the 15,625 dots employed in the illustrative embodiment of the invention are made upon the screen of Fig. 3.

Fig. 6 shows the order in which the dots are formed upon the screen 130 in accordance with the assignment of the range values to the screen subdivisions as given in Fig. 5. Assuming that the antenna is in that portion of its scanning cycle that it is pointing to the extreme upper left-hand part of its field of view, the range deflecting circuits cause the electron beam to strike first the upper left-hand corner of the lower left-hand subdivision, where the electron beam remains for approximately 18.3 microseconds. This position of the electron beam is marked by a numeral 1 in Fig. 6. At the end of the 18.3 microsecond interval, the range deflecting circuits shift the beam to position 2 in the upper left-hand corner of the second subdivision in the lower row, where the beam rests for a further interval of 18.3 microseconds. Positions 3, 4 and 5 are next taken, the first five positions taking up a total time interval of 5×18.3 or 91.5 microseconds. At the end of 91.5 microseconds the electron beam is shifted to position 6 in the upper left-hand corner of the left-hand subdivision in the next to bottom row. Here the electron beam rests for approximately 9.15 microseconds. After assuming successively all positions from 1 to 25, inclusive, as indicated in Fig. 6 a total interval of 183 microseconds has elapsed, during which all echoes from objects not more than 30,000 yards distant have had time to return and be registered, each in its proper screen subdivision according to the distance of the object.

During the following 817 microseconds the range deflecting circuits restore the beam to the lower left-hand subdivision, and blank out the beam, no more pulses being detected until the next transmitted pulse occurs, at the end of the 1/1000 second period between synchronizing pulses. Meanwhile, the antenna scanning mechanism has moved the antenna to point it slightly to the right, and inappreciably lower, so that the next dot is formed at position 26 as shown in Fig. 6.

During a complete scanning cycle of the antenna the total of 15,625 dots have been formed, the last dot being in the lower right-hand corner of the upper right-hand subdivision as shown by numeral 15,625 in Fig. 6. All twenty-five views have then been completed, in 0.625 second, which is the time of 625 transmitted pulses.

Due to the relatively long period required to complete the picture, it is desirable that the screen 130 shall have the property of remaining luminous for the entire interval in which the picture is built up, or even better, for several times that long. Successive echo pulses from any given object will then tend to combine their individual effects in a cumulative manner to build up a brighter signal in response to a signal of given intensity. Certain phosphorescent screens which are readily available have this desirable property and are preferred by me in practicing the invention.

The invention, as has been mentioned above, enables the azimuth, elevation and range of each of several distant objects to be displayed simultaneously upon one and the same viewing screen of convenient size. The way in which the presentation is interpreted will be evident from a consideration of Figs. 3, 4 and 5. The presentation per se is shown in Fig. 3 wherein 25 views are shown, each view representing objects lying within a specified group of ranges. Fig. 5 gives the limits of the group of ranges peculiar to each view. The spots depicted on the screen 130 in Fig. 3 represent objects. The screen in Fig. 3 shows as a matter of illustration the following objects listed below with the range and direction of each as indicated approximately:

| Reference Numeral of Spot Identifying Object | Range of Object in Yards | Direction of Object |
| --- | --- | --- |
| 304 | 12,000 to 15,000 | On the level or mean beam elevation and dead ahead. |
| 405 | 16,500 to 18,000 | Slightly to the left and slightly above the horizon or mean beam elevation. |
| 406 | 16,500 to 18,000 | Somewhat to the right and somewhat below the horizon or mean beam elevation. |
| 303 | 27,750 to 28,250 | To the left and below. |
| 302 | 29,500 to 29,750 | To the right and above. |

The objects represented by the spots 405 and 406 are represented on a larger scale in Fig. 4. Each spot is composed of nine dots as explained hereinbefore. The center dot comprised in the spot 405 is located 0.6 degree to the left and 0.6 degree above the horizon or mean beam elevation which follows from the data of the scanning system whereby each dot is separated from the next by 0.6 degree difference in the pointing of the antenna. The spot 406 may likewise be observed precisely as indicating an object 1.8 degrees to the right and 3.6 degrees below the horizon or mean beam elevation.

It remains to describe a mechanism for shifting the electron beam from place to place in accordance with a selected schedule of ranges to be represented in each view. In the illustrative embodiment shown in the drawings, the shifting is accomplished by what are designated the range deflecting circuits 151 acting upon the conventional deflecting amplifiers and deflecting plates of the oscilloscope 124 through the mixers 136 and 142 in conjunction with the azimuth and elevation potentiometers of the conventional system.

Fig. 2 is a detailed schematic diagram of the range deflecting circuits 151 of Fig. 1. In Fig. 2, the input terminal 153 is connected to the input portion of a first horizontal deflecting stage 200 including a conventional single-pulse multivibrator designated as a start-stop timer 201. The latter has its output connected to the control circuit of an oscillator 202. In the output circuit of the oscillator is connected a simple phase adjuster 203 which is connected in turn to a limiter 204, thence to a pulse generator 205, a step generator 206 and a mixing and enabling amplifier 207. The output of the amplifier 207 is connected through a lead 208 to an amplifier 209. The output of the amplifier 209 is connected through a base clipping diode 210 to the output terminal 154, and also through a limiting amplifier 211 to the output terminal 156.

The start-stop timer 201 has its output connected also to a pulse generator 212 and to a delay network 213. The output of the network 213 is connected to an enabling cathode follower 214, the output of which latter is connected through a lead 215 to internal control elements both in the step generator 206 and in the mixing and enabling amplifier 207.

The pulse generator 212 has an output terminal connected to the input circuit of a second horizontal deflecting stage 217 similar to the first horizontal deflecting stage 200 but differing in certain details to be indicated hereinafter. The pulse generator 212 is also connected through a delay network 264 to a vertical range deflecting circuit 229.

The stage 217 comprises a start-stop timer 218, an oscillator 219, a phase adjuster 220, a limiter 221, a pulse generator 222, a step generator 223 and a mixing and enabling amplifier 224 connected in tandem in the order named, the output of the amplifier 224 being connected through a lead 225 to the input of the amplifier 209. The output of the start-stop timer 218 is connected to a pulse generator 226 and to a delay network 227, which latter is connected through an enabling cathode follower 228 to the step generator 223 and to the mixing and enabling amplifier 224. The pulse generator 226 is connected to the input of a third horizontal deflecting stage 230, and also through a delay network 265 to a vertical range deflecting circuit 231.

The several outputs of the third horizontal deflecting stage 230 are connected respectively to the amplifier 209, to a vertical range deflecting circuit 233 through a delay network 266 and to the input of the fourth horizontal deflecting stage 232. The several outputs of stage 232 are connected respectively to the amplifier 209, to a vertical range deflecting circuit 235 through a delay network 267, and to the input of the fifth horizontal deflecting stage 234. The output of stage 234 is connected to the amplifier 209. The respective outputs of the four vertical range deflecting circuits 229, 231, 233 and 235 are connected in parallel to the output terminal 155.

The start-stop timer 201 is a conventional single-pulse multivibrator comprising two triodes 236 and 237, of which triode 236 is the input tube and has its cathode connected to the input terminal 153. The circuit is actuable by means of a positive pulse impressed upon the cathode of triode 236 to initiate upon the anode of the triode 237 a negative rectangular shaped pulse the duration of which is adjustable by selection of the controlling values of resistance and capacity in the circuit as is well known in the art. In the illustrative system herein described the duration of the pulse produced by the start-stop timer 201 is to be set at 91.5 microseconds, which in terms of echoes in a radar system is the time interval required to send a radar pulse to an object 15,000 yards distant and to receive an echo pulse therefrom. In this description it will often be convenient to express time intervals in terms of the distance of an object whose echo returns in the time interval to be expressed. The timer 201 is actuated by synchronizing pulses reaching the input terminal 153 from the generator 111. The potential at the anode of the triode 237 remains at a high positive value until a synchronizing pulse reaches the cathode of the triode 236, whereupon the said anode potential falls sharply to a low value which it holds for 91.5 microseconds. The anode potential then returns suddenly to the original high value where it remains until the next synchronizing pulse arrives.

The oscillator 202 comprises a triode 238 under the control of the pulse generated in the start-stop timer. The oscillator 202 may be a generator of either a damped or an undamped wave, but should have the property of starting up in the same phase each time it is energized. In the arrangement shown in Fig. 2, in the non-oscillatory condition, anode current from a supply source is passed through an inductance 268 in series with the anode-cathode path of the triode 238. The negative step voltage from the start-stop timer 201 is impressed upon the grid of the tube 238, abruptly open-circuiting the anode-cathode path and causing the current in the inductance 268 to be diverted into a capacitance 269. The presence of the inductance in the circuit prolongs the charging current thereby charging the capacitance. Oscillations at a frequency rate determined by the inductance 268, the fixed capacitance 269, and the tube and wiring capacitances, persist for several cycles, depending upon the damping present. The oscillation always starts in the particular phase represented by substantially no charge upon the capacitor 269. The positive step voltage from the start-stop timer abruptly enables the tube 238 to pass anode-cathode current thereby discharging the capacitor 269 and rapidly quenching the oscillations.

In the illustrative embodiment the period of one oscillation is 18.3 microseconds which corresponds to a frequency of approximately 54.6 kilocycles. In terms of distances, each cycle corresponds to 3000 yards and five complete oscillations correspond to 15,000 yards. The essential function of the oscillator is to time the shifting of the electron beam from one screen subdivision to the next in the lower row of five subdivisions.

The phase adjuster 203 is shown as a simple combination of an inductance 239 and a variable resistor 240. The output of the oscillator 202 is connected in series with the elements 239 and 240 and a substantial replica of the oscillator output is obtained across the variable resistor, the phase relationship between the replica and the oscillator output being variable over a moderate range by varying the resistance value of the resistor 240.

The limiter 204 comprises a triode 241 in the anode circuit of which are connected a pair of capacitors 242 and 243 and a resistor 244. A pair of oppositely directed rectifiers 245 and 246 are connected essentially in parallel with each other and in parallel with the series combination of capacitor 243 and resistor 244, there being a blocking condenser 247 in series with the rectifier 246. A negative or blocking bias is impressed upon the rectifiers 245 and 246 from a potential source connected between ground and the junction of the rectifier 246 and the condenser 247. The triode 241 functions as an amplifier to repeat the oscillations impressed upon its grid from the resistor 240. The anode of the triode rises and falls in potential in synchronism with the oscillations. A rise in anode potential causes the capacitors 242 and 243 to draw a charging current from the anode supply source through the resistor 244. The current through the capacitor 243 rises rapidly at first, increasing the potential of the capacitor and quickly overcoming the blocking bias thereon. Immediately the rectifier 246 begins to share the charging current of the capacitor 242, taking a larger and larger share as the anode potential increases. By careful design the current through the resistor 244 may be made to remain substantially constant over the greater part of the positive portion of the cycle. A fall in anode potential causes the capacitors 242 and 243 to discharge through the anode-cathode path of the triode 241, the rectifier 245 coming into play to maintain a substantially constant current through the resistor 244. The over-all result of the action of the limiter 204 is to produce a square-topped wave in response to the sinusoidal wave received by the limiter from the oscillator.

The pulse generator 205 is a conventional differentiating circuit comprising a capacitor 248 and a resistor 249 connected in series with the output of the limiter 204. The time constant of the combination 248, 249 is made small in order to produce the differentiating effect whereby current flows briefly in the resistor 249 only when change occurs in the impressed voltage, the current being substantially proportional to the rate of change of the impressed voltage. It is well known that such a circuit converts a square-topped wave into a series of sharp impulses alternating positive and negative.

The step generator 206 comprises a pentode 250 having a capacitor 251 connected between its anode and cathode. Anode current supply for the pentode 250 is connected in series with the anode-cathode path of a triode 252. The pentode 250 is normally cut off by means of a blocking bias impressed upon its control grid. The triode 252 has its cathode connected to ground through three parallel circuit branches, (1) the anode-cathode path of the pentode, normally cut off, (2) the capacitor 251, and (3) a highly resistive grid leak resistor 253 associated with a triode 254 in the mixing and enabling amplifier 207. A large positive biasing potential is applied to the grid of the triode 252 causing the cathode thereof to remain normally at the cut-off potential and at a considerable potential above ground, e. g., 100 volts.

The 15,000 yard start-stop pulse from the timer 201 is applied to the grid of the triode 252 in negative polarity to overcome the normal positive potential thereon during the period of the 15,000 yard pulse. The pulse is applied to the triode 252 through the delay network 213, the enabling cathode follower 214 and the lead 215. During the application of the 15,000 yard pulse the triode 252 is cut off and thus is unable to maintain the voltage on the capacitor 251. During this interval, the 3,000 yard pulses from the pulse generator 205 are applied to the grid of the pentode 250 causing a constant current to be drawn from the capacitor 251 during the brief existence of each 3,000 yard pulse. The timing of the pulses is arranged by adjustment of phase adjuster 203 so that the first pulse to be utilized occurs at the same instant as the triode 252 is disabled. The voltage across the capacitor 251 drops in equal increments, called herein e volts, at intervals of 3,000 yards during the 15,000 yard interval. At the end of this interval the triode 252 is enabled, thus charging the capacitor 251 back to its quiescent voltage, here assumed to be 100 volts.

The mixing and enabling amplifier 207 comprises the triode 254 having a cathode resistor 255 through which the cathode is normally biased to a cut-off potential. The triode 254 is enabled during the 15,000 yard pulse by virtue of the application of the pulse in negative polarity to the cathode resistor 255 through the lead 215 and a condenser 260. The principal functions of the amplifier 207 are to reverse the polarity of the output from the step generator 206 and to cut off or suppress the recharging transient of the capacitor 251.

The amplifier 209, the base clipping diode 210 and the limiting amplifier 211 are of conventional design and their functions in the system embodying the invention have to do with a combined output from the five horizontal deflecting stages. Further discussion of the devices 209, 210 and 211 is best reserved until after the description of the individual horizontal deflecting stages is completed.

The pulse generator 212 is similar to the pulse generator 205. The generator 212 receives the 15,000 yard pulse from the timer 201 and supplies to the delay network 264 and to the start-stop timer 218 a short negative pulse at the start and a short positive pulse at the end of the 15,000 yard interval. The negative pulse is not utilized. The positive pulse enables the start-stop timer 218 and, through the network 264, enables the vertical range deflecting circuit 229.

The delay network 213 and the enabling cathode follower 214 are each of conventional design. The delay networks 264 to 267, inclusive, may be of conventional design and all may be similar to the network 213 except for the amount of time delay.

The second horizontal deflecting stage 217 is similar to the first such stage 200, the principal difference being that the second stage is triggered off by the output of the first stage when the operation of the first stage is completed. Accordingly, the start-stop timer 218 in the second stage is started by a positive pulse from the pulse generator 212 in the first stage upon the completion of the 0–15,000 yard interval. Referring to the scheme shown in Fig. 6, the second horizontal row of screen subdivisions represents the 15,000–22,500 yard interval. The second row of views is formed in response to horizontal deflecting potentials generated by the second horizontal deflecting stage. Hence, the start-stop timer 218 is designed to start nominally at 15,000 yards and to stop nominally at 22,500 yards. To divide the 15,000–22,500 yard interval into five equal parts each alloted to one view, the oscillator 219 is designed to operate at 109.2 kilocycles. Except for these differences and incidental circuit variations resulting therefrom the second horizontal deflecting stage is identical with the first.

The third horizontal deflecting stage 230 is designed to operate during the nominal 22,500–26,250 yard interval and includes an oscillator designed to operate at 218.4 kilocycles.

The fourth horizontal deflecting stage 232 is designed for the nominal 26,250–28,750 yard interval and includes a 327.6 kilocycle oscillator.

The fifth horizontal deflecting stage 234 is designed for the nominal 28,750–30,000 yard interval and includes a 655.2 kilocycle oscillator.

The anode lead 208 from the mixing and enabling amplifier 207 is connected together with the lead 225 from the similar amplifier 224 and leads from three similar amplifiers in the stages 230, 232, and 234, to the input terminal of the amplifier 209, in parallel with an anode circuit resistor 256 which latter is connected to a source of positive supply potential.

The amplifier 209 is a conventional video amplifier. It is actuated by any change in the potential drop in the resistor 256. Such changes may be effected by changes of anode potential in any one of the five mixing and enabling amplifiers of which two are numbered 207 and 224 respectively. Due to the operation of the respective start-stop timers the mixing and enabling amplifiers actuate the amplifier 209 one at a time in regular succession as will be explained more fully hereinafter.

The base clipping diode 210 is provided with a positive bias of adjustable value applied to its cathode by means of a potentiometer 257 and a resistor 258. One terminal of the potentiometer 257 is connected to a positive potential supply source. The function of the diode 210 is conventional, that of passing current when and only when a positive potential is impressed upon its anode in an amount exceeding that of the cathode bias. The effect of passing a potential wave through the device 210 is to clip the base of a wave and repeat that part of the wave that exceeds the cathode bias value. The output of the device 210 appears at the terminal 154.

The limiting amplifier 211 is of conventional design. Its function is to eliminate substantially all potential variations of a wave applied thereto except the initial and final variations. In other words, the function of the amplifier 211 is to produce a long pulse, extending throughout the 0–30,000 yard interval from the start to finish of the operation of amplifier 209. The use of the resultant pulse in the system of the invention will be explained hereinafter. The output of the amplifier 211 appears at the terminal 156.

The vertical range deflecting circuits 229, 231, 233 and 235 are simple video amplifiers designed to be actuated by pulses of substantially equal amplitude. Each circuit is adjusted to have a distinctive value of amplification or gain, whereby a pulse applied to the circuit 229 produces a response comprising an output pulse of one unit amplitude, a pulse applied to the circuit 231 produces an output pulse of two units amplitude, the circuit 233 a pulse of three units amplitude, and the circuit 235 a pulse of four units amplitude. The circuits 229, 231, 233 and 235 operate successively and their combined outputs appear at the terminal 155.

Figure 7:
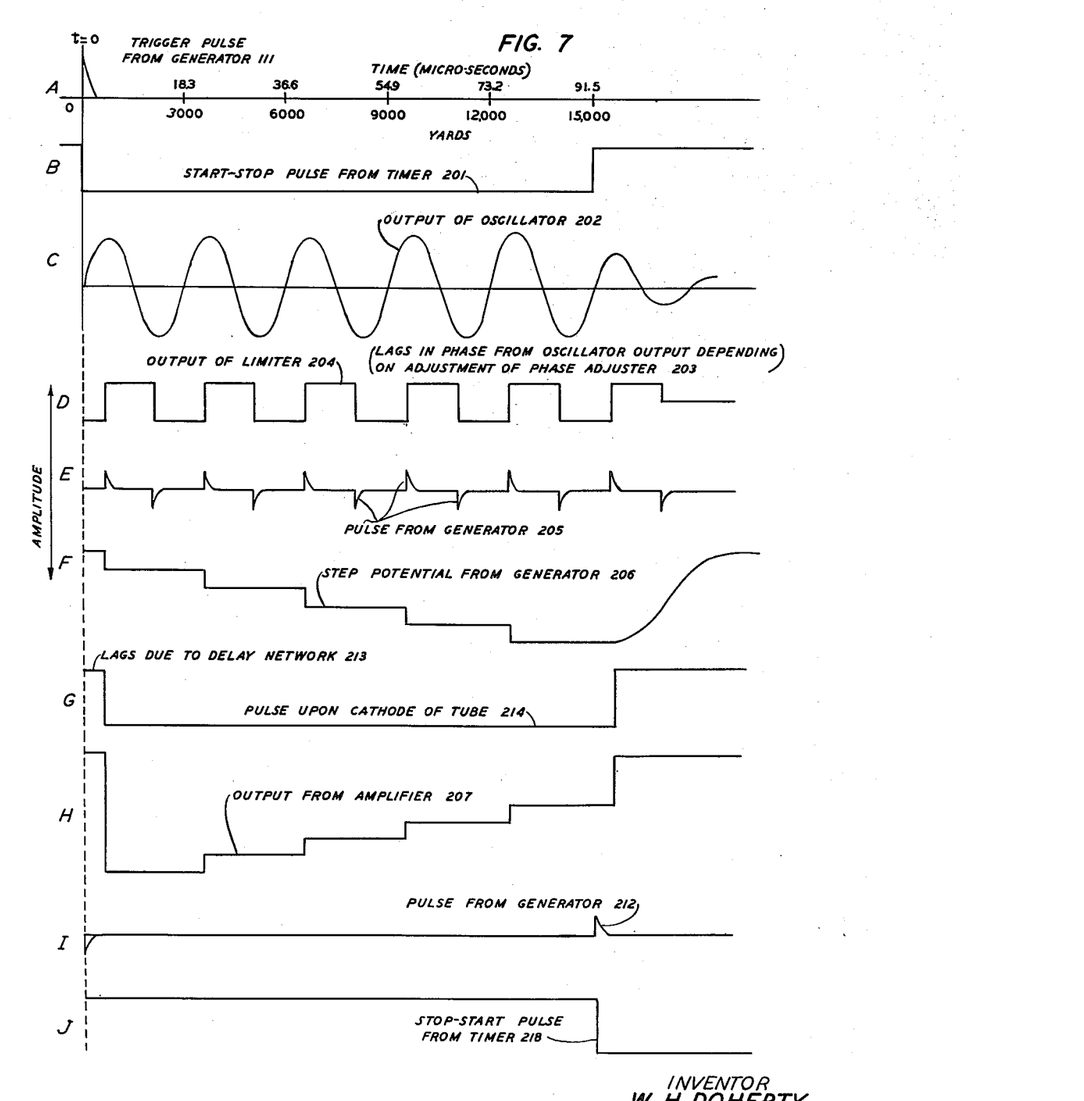
Figs. 7 and 8 are sets of plots of amplitude vs. time representing ideal conditions to be approached as closely as practicable at various points in the Range Deflecting Circuits of Fig. 2.
Figure 8:
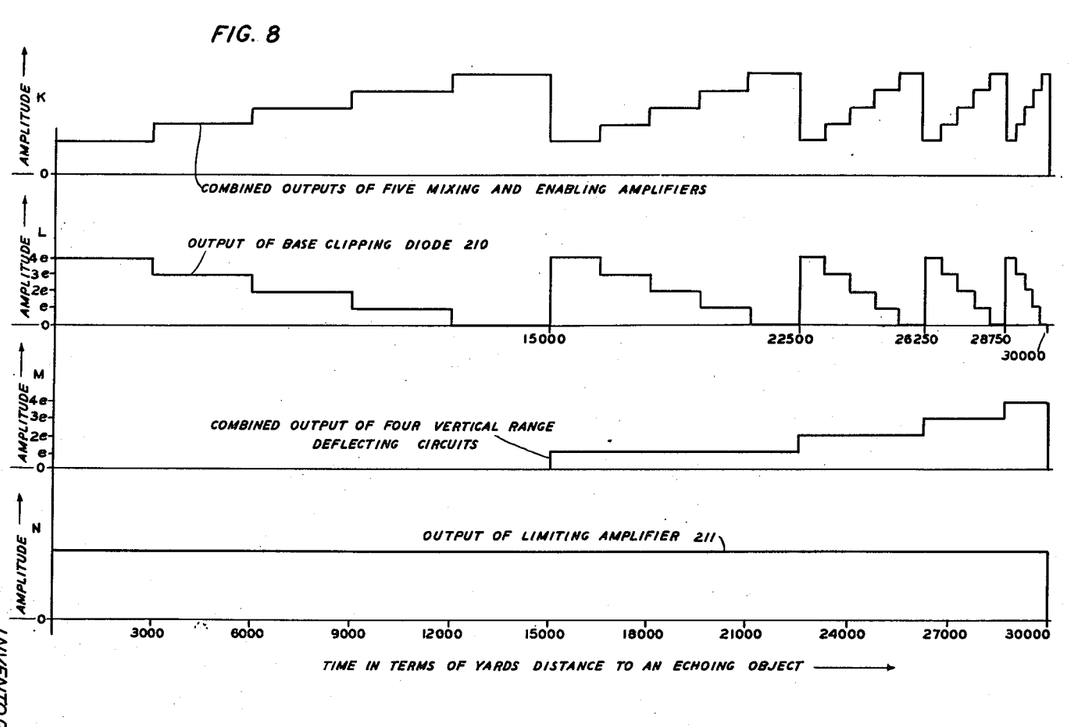

The several functions of the range deflecting circuits may be more fully understood by reference to the sets of wave forms plotted in Figs. 7 and 8.

In Fig. 7, a plot A shows a trigger pulse as received from the synchronizing pulse generator 111, arriving at the input terminal 153 at an instant which will be designated zero yards. Plot B shows a 15,000 yard pulse generated by the start-stop timer 201 in response to the trigger pulse of plot A. Plot B represents the potential of the anode of the tube 237 which assumes a high potential between pulses and drops to a very low potential when the tube 236 is cut off by the application of the trigger pulse. The tube 237 remains conductive until the end of a 15,000 yard interval at which time the tube 237 is cut off and its anode potential suddenly rises to its original high value. The interval is timed by the circuit constants of the timer 201 in known manner.

Plot C shows the output of the oscillator 202 as it is started in operation by the beginning of the pulse from the timer 201 in plot B. The oscillator makes five or more complete oscillations before it is quenched. It is relatively unimportant how long the oscillator continues to run after the required number of oscillations have been completed, provided the oscillator has been quenched and restored to a suitable stand-by condition before the next following pulse occurs in the timer 201. The function of the oscillator is to divide the interval of the start-stop pulse into an integral number of equal parts to control the shift from one screen subdivision to the next throughout one row of subdivisions.

Plot D shows the effect of the limiter 204 upon the wave of plot C, whereby the sinusoidal output wave from the oscillator is converted into a square-topped wave. This wave lags in phase by an amount depending on the adjustment of the phase adjuster 203. This wave represents an intermediate step in the production of a series of short pulses separated by intervals of equal duration.

Plot E shows the effect of the pulse generator 205 upon the wave of plot D, whereby a positive pulse of brief duration is produced by each upward step in the square-topped wave and a negative pulse of brief duration is produced by each downward step.

Plot F shows the output potential wave of the step generator 206 when actuated by successive positive pulses from the pulse generator 205. The plot shows the potential of the cathode side of the capacitor 251. The cathode normally maintains a relatively large positive potential, which is reduced step by step upon the application of the positive pulses.

Plot G shows the pulse generated by the cathode follower 214. The cathode is normally at a positive potential and during the application of the 15,000 yard pulse in the negative polarity to the grid of the cathode follower tube, the cathode potential falls to a very low value, producing a negative pulse upon the cathode. This pulse is impressed upon a capacitor 259 in the grid circuit of the triode 252 to charge the capacitor, the negative charge being upon the side of the capacitor 259 next to the grid. The same pulse is also impressed upon the capacitor 260 in the cathode circuit of the triode 254, the negative charge being upon the side next to the cathode. When the cathode potential of the cathode follower 214 falls to its low value the positive side of each capacitor is effectively grounded, thereby applying the negative charge of the capacitor 259 to the grid of the tube 252, disabling the tube 252, and applying the negative charge of the capacitor 260 to the cathode of the tube 254, enabling the latter tube to conduct. The effect of disabling the tube 252 is to permit the step generator to function as shown in plot F. The effect of enabling the tube 254 during the 15,000 yard interval is to repeat the useful portion of the wave in plot F while eliminating the trailing end portion thereof. The output of the amplifier 207, which is the anode potential wave of the tube 254, is as shown in plot H.

Plot I shows the output from the pulse generator 212. This consists of a brief negative pulse produced by the downward step of the timer pulse in plot B and a brief positive pulse produced by the upward step. The negative pulse is not used herein, but the positive pulse is impressed upon the input of the start-stop timer 218 in the second horizontal deflecting stage 217, initiating a 7,500 yard pulse in the timer 218 during the interval nominal 15,000–22,500 yards, which pulse is shown in plot J.

In Fig. 8, plot K shows the combined outputs of five mixing and enabling amplifiers after combination in amplifier 209 taking into account the 180 degree phase difference produced in the resistor 256. All necessary delays and phase adjustments are assumed to have been made to fit the outputs of the respective stages into a composite horizontal range deflecting wave form as shown. The delay networks 213, 227 and corresponding networks in circuits 230, 232 and 234 are used for the purpose of providing the required coarse adjustments in delay time, while five adjustments in phase are made by use of the phase adjusters 203, 220, and the like.

Plot L shows how the wave of plot K appears after modification in the amplifier 209 and the diode 210. A 180 degree phase shift occurs in the amplifier 209 and the base of the wave is clipped in the diode 210, producing a stepped wave of four equal step values, each step equal to $e$.

The wave shown in plot L is adapted to produce the horizontal shifting necessary to set up the scheme of views as shown in Fig. 5.

Plot M shows the combined output of the four vertical range deflecting circuits, the wave shown being adapted to produce the vertical shifting necessary to set up the scheme of frames as shown in Fig. 5. Such phase shifts as may be required to fit the outputs of the respective vertical range circuits into a composite wave form as shown in plot M may be obtained by adjustment of the delay networks 264, 265, 266 and 267.

Plot N shows the 30,000 yard pulse produced in the limiting amplifier 211. This pulse is impressed upon the control electrode 123 of the oscilloscope 124 to enable the oscilloscope during the entire 30,000 yard interval during which echoes are to be received and to disable the oscilloscope between radar pulses.

The delay network 160 may be adjusted to synchronize the transmitter pulse with the start of the horizontal range deflecting wave of plot L. The delay network 161 may be employed instead to delay all the echo pulses by the necessary amount to effect the same purpose, or the required delay may be divided between the networks 160 and 161 as desired.

What is claimed is:

1. An indicator for use with a repeating radio pulse reflection system arranged to scan a field of view for object location, said indicator comprising a cathode ray oscilloscope with a luminescent viewing screen having a plurality of subdivisions, means for controlling the intensity of the cathode ray of said oscilloscope to excite said screen to produce a bright spot where the ray strikes the screen when a reflected radio pulse is received, means synchronized with the sending out of each radio pulse to shift the said cathode ray from one subdivision of the said screen to another successively, spending a measured interval of time in each subdivision to receive reflected pulses from a preassigned zone of distances, and means synchronized with the scanning mechanism of said radio pulse reflection system for varying the relative position within each screen subdivision to which the said ray is directed to indicate with respect to the field of view the directional coordinates of any object from which a reflected radio pulse is received.

2. An indicating system for radar apparatus comprising a viewing screen having a plurality of subdivisions, means to transmit an exploratory pulse, means to receive echo pulses from a plurality of reflecting objects located at various distances, means to produce a visible spot indication upon said viewing screen in response to each said echo pulse, means to distribute said spot indications to various respective subdivisions of said viewing screen in accordance with the distance of each said reflecting object, said echo pulse receiving means being selective as to the direction from which pulses may be received, means to vary independently of each other the azimuth and elevation to which said echo pulse receiving means is selective, and means to vary in two dimensions the location within a particular subdivision where the said spot indication is produced to indicate the azimuth and elevation of the object from which the echo pulse is received.

3. An indicating system for radar apparatus, comprising a directional antenna, scanning mechanism for varying the direction of said antenna, a cathode ray oscilloscope having a viewing screen, deflecting means for the cathode ray of said oscilloscope, means coupling said scanning mechanism to said deflecting means to deflect said cathode ray in accordance with variations in the direction of said antenna, pulse transmitting means, means to receive echo pulses from a plurality of reflecting objects located at various distances from said antenna, a transmission path between said pulse transmitting means and said means to receive echo pulses, said transmission path including said directional antenna, means controlled by received echo pulses to make a spot indication upon said viewing screen for each said received pulse, timing means controlled by said pulse transmitting means, and step generating means actuated by said timing means and coupled to said deflecting means to deflect said cathode ray in discreet steps from portion to portion of said viewing screen to distribute echo pulse indications according to the distance to the respective reflecting object.

4. An indicating system for radar apparatus, comprising a directionally selective antenna, means for varying the direction to which said antenna is selective, a cathode ray oscilloscope having a viewing screen, control means for directing the cathode ray of said oscilloscope to any portion of said viewing screen, means actuated by variations in the direction to which the antenna is selective coupled to said control means to direct said cathode ray in accordance with variations in the direction to which the said antenna is selective, means to transmit exploratory pulses from said antenna, means to receive echo pulses from a plurality of reflecting objects located at various distances from said antenna, means controlled by said received echo pulses to make a spot indication upon said viewing screen for each said received echo pulse, timing means, and means actuated by said timing means and coupled to said control means in superposition with said means actuated by variations in the direction to which the antenna is selective to shift said cathode ray in discreet steps from one portion of said viewing screen to another to distribute received echo pulse indications according to the distance to the respective reflecting object.

WILLIAM H. DOHERTY.

REFERENCES CITED

The following references are of record in the file of this patent:

UNITED STATES PATENTS

| Number | Name | Date |
| --- | --- | --- |
| 2,172,354 | Blumlein | Sept. 12, 1939 |
| 2,191,565 | Henroteau | Feb. 27, 1940 |
| 2,203,528 | Harnett | June 4, 1940 |
| 2,207,716 | Bumstead | July 16, 1940 |
| 2,412,702 | Wolff | Dec. 17, 1946 |
| 2,419,239 | White | Apr. 22, 1947 |
| 2,426,189 | Espenschied | Aug. 26, 1947 |

FOREIGN PATENTS

| Number | Country | Date |
| --- | --- | --- |
| 392,810 | Great Britain | May 25, 1933 |